(12) United States Patent
Takao et al.

(10) Patent No.: US 11,347,918 B2
(45) Date of Patent: May 31, 2022

(54) VALIDATION PROCESSING DEVICE, VALIDATION PROCESSING METHOD, AND PROGRAM

(71) Applicant: MITSUBISHI HEAVY INDUSTRIES ENGINEERING, LTD., Yokohama (JP)

(72) Inventors: Kenji Takao, Tokyo (JP); Keita Hirayama, Tokyo (JP)

(73) Assignee: MITSUBISHI HEAVY INDUSTRIES ENGINEERING, LTD., Yokohama (JP)

(*) Notice: Subject to any disclaimer, the term of this patent is extended or adjusted under 35 U.S.C. 154(b) by 0 days.

(21) Appl. No.: 17/278,491

(22) PCT Filed: Oct. 3, 2019

(86) PCT No.: PCT/JP2019/039133
§ 371 (c)(1),
(2) Date: Mar. 22, 2021

(87) PCT Pub. No.: WO2020/090345
PCT Pub. Date: May 7, 2020

(65) Prior Publication Data
US 2022/0114314 A1    Apr. 14, 2022

(30) Foreign Application Priority Data

Nov. 1, 2018 (JP) .............................. JP2018-206518

(51) Int. Cl.
*G06F 30/3308* (2020.01)
*G06F 30/13* (2020.01)
(Continued)

(52) U.S. Cl.
CPC .......... *G06F 30/3308* (2020.01); *G06F 30/13* (2020.01); *G06F 30/15* (2020.01);
(Continued)

(58) Field of Classification Search
CPC .......... G06F 30/13; G06F 30/15; G06F 30/17; G06F 30/18; G06F 30/3308;
(Continued)

(56) References Cited

U.S. PATENT DOCUMENTS 3,961,250 A * 6/1976 Snethen ......... G01R 31/318371
703/15
5,559,811 A * 9/1996 Abramovici ... G01R 31/318371
714/738
(Continued)

FOREIGN PATENT DOCUMENTS

JP 04310185 A * 11/1992 ............. G06F 15/60
JP H07146800 A * 6/1995 ............... G06F 9/46
(Continued)

OTHER PUBLICATIONS

PCT/ISA/210, "International Search Report for International Application No. PCT/JP2019/039133," dated Dec. 17, 2019.
(Continued)

*Primary Examiner* — Phallaka Kik
(74) *Attorney, Agent, or Firm* — Manabu Kanesaka; Benjamin Hauptman; Kenneth Berner

(57) ABSTRACT

This validation processing device is provided with: a processing unit that performs model checking on a model to be checked; and a selection unit that selects, on the basis of the result of the model checking, one element from among elements that have undergone state change in a process leading to an unsafe event. The processing unit further performs model checking again on the model to be checked excluding the one element.

9 Claims, 10 Drawing Sheets

(51) Int. Cl.
*G06F 30/15* (2020.01)
*G06F 30/17* (2020.01)
*G06F 30/18* (2020.01)
*G06F 30/367* (2020.01)
*G06F 30/398* (2020.01)
*G06F 111/08* (2020.01)
*G06F 119/02* (2020.01)
*G06F 111/06* (2020.01)
*G06F 111/02* (2020.01)
*G06F 111/04* (2020.01)

(52) U.S. Cl.
CPC .............. *G06F 30/17* (2020.01); *G06F 30/18* (2020.01); *G06F 30/367* (2020.01); *G06F 30/398* (2020.01); *G06F 2111/02* (2020.01); *G06F 2111/04* (2020.01); *G06F 2111/06* (2020.01); *G06F 2111/08* (2020.01); *G06F 2119/02* (2020.01)

(58) Field of Classification Search
CPC .. G06F 30/367; G06F 30/398; G06F 2111/02; G06F 2111/04; G06F 2111/06; G06F 2111/08; G06F 2119/02
USPC ........ 716/106, 112, 136; 703/1, 8, 9, 11, 12, 703/14
See application file for complete search history.

(56) References Cited

U.S. PATENT DOCUMENTS

| | | | | |
|---|---|---|---|---|
| 5,566,187 | A * | 10/1996 | Abramovici | G01R 31/318586 714/724 |
| 5,701,443 | A * | 12/1997 | Oguma | G06F 30/33 703/15 |
| 6,067,651 | A * | 5/2000 | Rohrbaugh | G01R 31/318544 714/726 |
| 6,151,694 | A * | 11/2000 | Nozuyama | G01R 31/31835 714/724 |
| 7,315,802 | B1 * | 1/2008 | Jenkins, IV | G06F 30/33 716/132 |
| 7,987,435 | B2 * | 7/2011 | Ogawa | G03F 1/36 716/51 |
| 11,276,089 | B1 * | 3/2022 | Salehie | G06F 16/285 |
| 11,279,032 | B2 * | 3/2022 | Bergantz | B25J 9/163 |
| 11,282,208 | B2 * | 3/2022 | Cohen | G06T 7/194 |
| 2003/0182638 | A1 * | 9/2003 | Gupta | G06F 30/33 716/108 |
| 2005/0149301 | A1 * | 7/2005 | Gupta | G06F 30/3312 703/2 |
| 2008/0072195 | A1 | 3/2008 | Mukaiyama | |
| 2009/0132227 | A1 | 5/2009 | Takada et al. | |
| 2012/0198399 | A1 * | 8/2012 | Safarpour | G06F 30/3323 716/106 |
| 2015/0142402 | A1 * | 5/2015 | Ramesh | G05B 23/0248 703/7 |
| 2015/0344050 | A1 | 12/2015 | Yanai et al. | |
| 2016/0116533 | A1 * | 4/2016 | Ishida | G01R 31/318342 714/726 |
| 2020/0387656 | A1 | 12/2020 | Takao et al. | |
| 2022/0081480 | A1 * | 3/2022 | Zhang | A61P 35/00 |
| 2022/0092620 | A1 * | 3/2022 | Pandey | G06Q 30/0204 |

FOREIGN PATENT DOCUMENTS

| | | | | |
|---|---|---|---|---|
| JP | H08278936 A | * | 10/1996 | ............. G06F 13/10 |
| JP | 2008-071135 A | | 3/2008 | |
| JP | 2009-122992 A | | 6/2009 | |
| JP | 2014-139052 A | | 7/2014 | |
| JP | 2017188001 A | * | 10/2017 | ............... G06F 9/44 |
| JP | 2018055567 A | * | 4/2018 | ............. G06F 10/10 |
| JP | 2019-125208 A | | 7/2019 | |
| WO | WO-2014174656 A1 | * | 10/2014 | ............. G05B 17/02 |

OTHER PUBLICATIONS

PCT/ISA/237, "Written Opinion of the International Searching Authority for International Application No. PCT/JP2019/039133," dated Dec. 17, 2019.

Aoki, Y. et al., "A method for detecting defects of program based on model checking techniques for development site," IEICE Technical Report, Jan. 16, 2012, p. 43-48, vol. 111, No. 396, ISSN: 0913-5685.

Morikawa, I. et al., "A method of detecting security flaws in web sessions through model checking," IEICE Technical Report, Apr. 12, 2007, p. 29-34, vol. 107, No. 5, ISSN: 0913-5685.

* cited by examiner

FIG. 6

⟨ TROUBLE LIST ⟩ L

| ELEMENT | NUMBER OF TRANSITION STEPS | | | | | | |
|---|---|---|---|---|---|---|---|
| | 0 (INITIAL STAGE) | 1 | 2 | 3 | 4 | 5 | 6 |
| X1 | FALSE | | | | TRUE | FALSE | |
| E1 | TRUE | | | | | | FALSE |
| E3 | TRUE | FALSE | | | | | |
| X5 | FALSE | | TRUE | FALSE | | TRUE | |
| E13 | FALSE | | TRUE | | | | |
| ⋮ | ⋮ | ⋮ | ⋮ | ⋮ | ⋮ | ⋮ | ⋮ |
| S1 | FALSE | | | | TRUE | | |
| ⋮ | ⋮ | ⋮ | ⋮ | ⋮ | ⋮ | ⋮ | ⋮ |
| T1 | FALSE | | TRUE | | | | |
| ⋮ | ⋮ | ⋮ | ⋮ | ⋮ | ⋮ | ⋮ | ⋮ |
| U1 | FALSE | | | | | | TRUE |
| ⋮ | ⋮ | ⋮ | ⋮ | ⋮ | ⋮ | ⋮ | ⋮ |

EXAMPLE OF FAILURE MODEL (CONTACT OF SIGNAL LINE)

※ $\lambda$ = PROBABILITY THAT CONTACT OF SIGNAL LINE OCCURS WITHIN UNIT TIME

VALIDATION PROCESSING DEVICE, VALIDATION PROCESSING METHOD, AND PROGRAM

RELATED APPLICATIONS

The present application is National Phase of International Application No. PCT/JP2019/039133 filed Oct. 3, 2019, and claims priority from Japanese Application No. 2018-206518, filed Nov. 1, 2018, the disclosure of which is hereby incorporated by reference herein in its entirety.

TECHNICAL FIELD

The present invention relates to a validation processing device, a validation processing method, and a program.

The present application claims priority with respect to Japanese Patent Application No. 2018-206518 filed in Japan on Nov. 1, 2018, the contents of which are incorporated herein by reference.

BACKGROUND ART

Patent Document 1 describes that model checking is used to comprehensively validate the operation logic of a data processing system.

CITATION LIST

Patent Document

[Patent Document 1] Japanese Unexamined Patent Application Publication No. 2008-071135

SUMMARY OF INVENTION

Technical Subject

For example, in a case of validating the operation logic of a relay circuit in model checking, it is not enough to validate the basic operation logic of the relay circuit, and it is necessary to perform validation, considering that troubles may occur in the signal lines and circuit elements included in the relay circuit.

Considering that troubles of signal lines and circuit elements (for example, contact (short circuited/interference) of signal lines, disconnection, failure of circuit elements) may occur simultaneously and asynchronously regardless of the basic operation logic of the relay circuit, in model checking, in addition to the state transitions that may occur during the basic operation, it is necessary to comprehensively validate all combinations of troubles that may occur from each state during the basic operation.

However, in such a case, even if a counterexample including a combination of a plurality of troubles caused in each signal line and each circuit element included in the relay circuit is output, some of the combinations of troubles may include troubles that do not necessarily contribute to (that are non-critical to) leading to an unsafe event.

In other words, model checking comprehensively checks the conditions (patterns) leading to unsafe events by expressing all possible states of the model to be checked with logical expressions using a binary decision diagram (BDD) or the like. The process leading to the unsafe event may include state transitions that are not necessarily critical. Therefore, there is no choice but to perform counterexample interpretation on counterexamples that may include non-critical troubles regarding unsafe events, which imposes a heavy load on the work of counterexample interpretation of model checking.

According to at least one embodiment of the present invention, there is a subject about providing of a validation processing device, a validation processing method, and a program capable of reducing the load required for the work of counterexample interpretation of model checking.

Subject to be Solved

According to a first aspect of the present invention, a validation processing device includes: a processing unit that performs model checking on a model to be checked; and a selection unit that selects, on the basis of a result of the model checking, one element among elements that have undergone a state change in a process leading to an unsafe event. The processing unit further performs model re-checking on a model to be checked which is obtained by excluding the one element.

According to a second aspect of the present invention, in a case where the model to be checked has not led to the unsafe event in the model re-checking, the processing unit returns the one element to the model to be checked, and performs model re-checking on a model to be checked which is obtained by excluding an element, which is different from the one element, from the model to be checked.

According to a third aspect of the present invention, in a case where the model to be checked has led to the unsafe event in the model re-checking, the processing unit does not return the one element to the model to be checked, and performs model re-checking on a model to be checked which is obtained by excluding an element, which is different from the one element, from the model to be checked.

According to a fourth aspect of the present invention, the processing unit performs the model re-checking within a range equal to or less than the number of transition steps leading up to the unsafe event specified in a first model checking for the model to be checked.

According to a fifth aspect of the present invention, the above-mentioned validation processing device further includes a specification unit that specifies a shortest path from an element extracted on the basis of a result of the model re-checking to an element included in a definition of the unsafe event.

According to a sixth aspect of the present invention, the above-mentioned validation processing device further includes a calculation unit that calculates a probability of leading the model to be checked to the unsafe event from an initial state, on the basis of a trouble occurrence probability defined for each element.

According to the seventh aspect of the present invention, in a case where the probability is lower than a predetermined determination threshold value, the selection unit omits processing of selecting the one element on the basis of a result of the model checking.

According to an eighth aspect of the present invention, the validation processing method includes: a step of performing model checking on a model to be checked; a step of selecting, on the basis of a result of the model checking, one element among elements that have undergone a state change in a process leading to an unsafe event; and a step of performing model re-checking on a model to be checked which is obtained by excluding the one element.

According to a ninth aspect of the present invention, a program causes a computer of a validation processing device to execute: a step of performing model checking on a model to be checked; a step of selecting, on the basis of a result of the model checking, one element among elements that have undergone a state change in a process leading to an unsafe event; and a step of performing model re-checking on a model to be checked which is obtained by excluding the one element.

Advantageous Effects of Invention

According to each aspect of the invention described above, the load required for the work of counterexample interpretation of model checking can be reduced.

BRIEF DESCRIPTION OF DRAWINGS

FIG. 6 is a diagram for explaining in detail the operation of the validation processing device according to the first embodiment.

DESCRIPTION OF EMBODIMENTS

First Embodiment

Hereinafter, a validation processing device according to a first embodiment will be described with reference to FIGS. 1 to 6.
(Configuration of Validation Processing Device)

Figure 1:
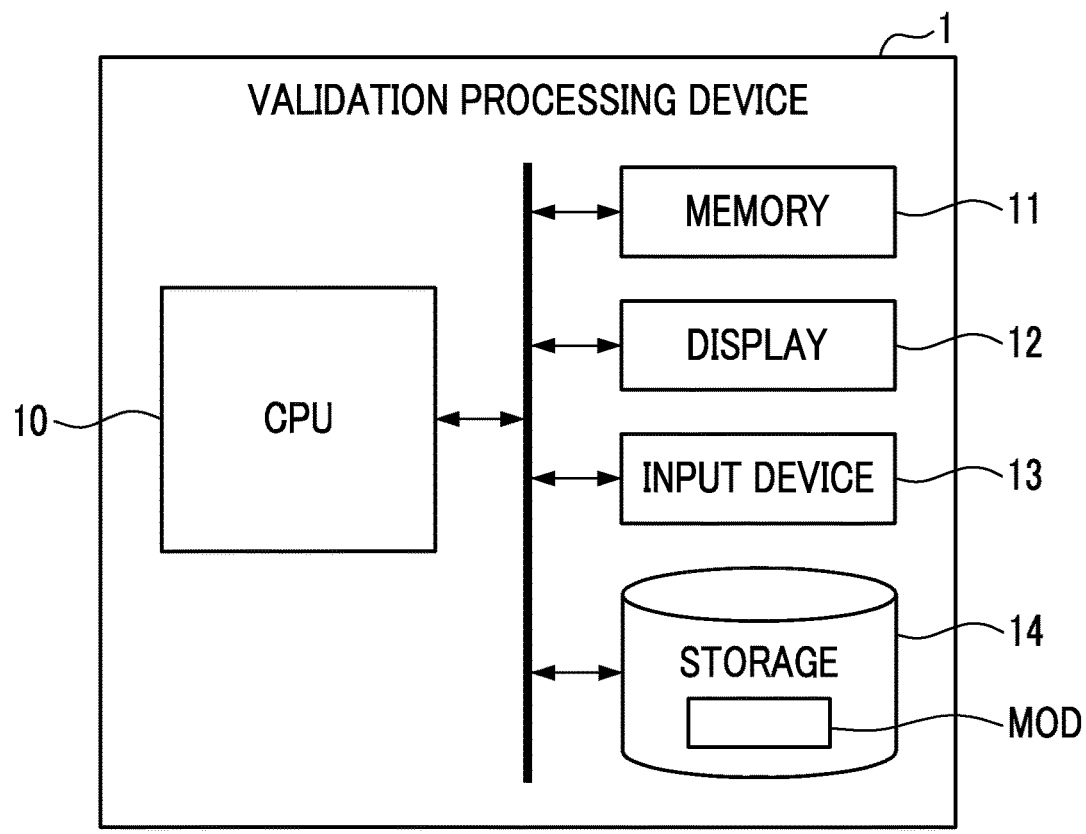
FIG. 1 is a diagram showing a configuration of a validation processing device according to a first embodiment.

FIG. 1 is a diagram showing a configuration of the validation processing device according to the first embodiment.

Figure 2:
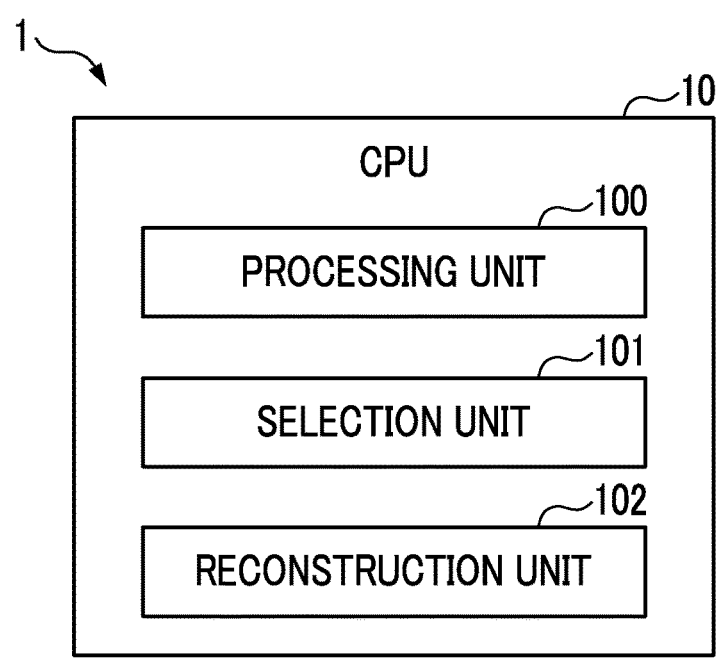
FIG. 2 is a diagram showing a functional configuration of a CPU of the validation processing device according to the first embodiment.

FIG. 2 is a diagram showing a functional configuration of a CPU of the validation processing device according to the first embodiment.

As shown in FIG. 1, the validation processing device 1 includes a CPU 10, a memory 11, a display 12, an input device 13, and a storage 14, and is configured as a general computer.

The memory 11 is a so-called main storage device, where commands and data for the CPU 10 to operate on the basis of a program are developed.

The display 12 is a display device that visually displays information, and may be, for example, a liquid crystal display or an organic EL display.

The input device 13 is an input device that receives the operation of the user of the validation processing device 1, and may be, for example, a general mouse, keyboard, touch sensor, or the like.

The storage 14 is a so-called auxiliary storage device, and may be, for example, a hard disk drive (HDD), a solid state drive (SSD), or the like. The storage 14 stores, for example, a model to be checked MOD indicating a relay circuit to be inspected.

The CPU 10 is a processor that controls the entire operation of the validation processing device 1. As shown in FIG. 2, the CPU 10 according to the present embodiment exerts functions as a processing unit 100, a selection unit 101, and a reconstruction unit 102.

The processing unit 100 performs model checking on the model to be checked MOD. The model checking performed here comprehensively checks the conditions (patterns) leading to unsafe events by expressing all possible states of the model to be checked with a logical expression by binary decision diagram (BDD) or the like. The model checking algorithm performed in this embodiment may be a well-known algorithm.

The model to be checked MOD is information that defines the operation logic of the system to be inspected (for example, a railway security system). In the model checking, the operation of the system is comprehensively validated in accordance with the operation logic defined herein.

The unsafe event is defined as a state in which the system to be inspected does not have to transition under any circumstances. For example, in a railway security system, the following states are defined as unsafe events: a state where "emergency brake does not work during automatic driving control of a vehicle"; a state where "a vehicle is traveling across a railroad but the crossing bar is not down"; and the like.

The selection unit 101 selects one element among the elements that have undergone state change in the process leading to an unsafe event, on the basis of the result of the model checking performed by the processing unit 100. The "element" is a minimum unit that defines the operation logic and state of the model to be checked MOD, and is, for example, a signal line or a circuit element mounted on a relay circuit of a security system or the like. As will be described later, the "element" also includes a virtual element defined to simulate the operation of the signal line or circuit element mounted on the actual relay circuit, as well as the operation of the relay circuit in a case where a trouble occurs.

In the process of model checking performed in this embodiment, the reconstruction unit 102 reconstructs the model to be checked MOD in accordance with predetermined conditions.
(Example of Model to be Checked)

Figure 3:
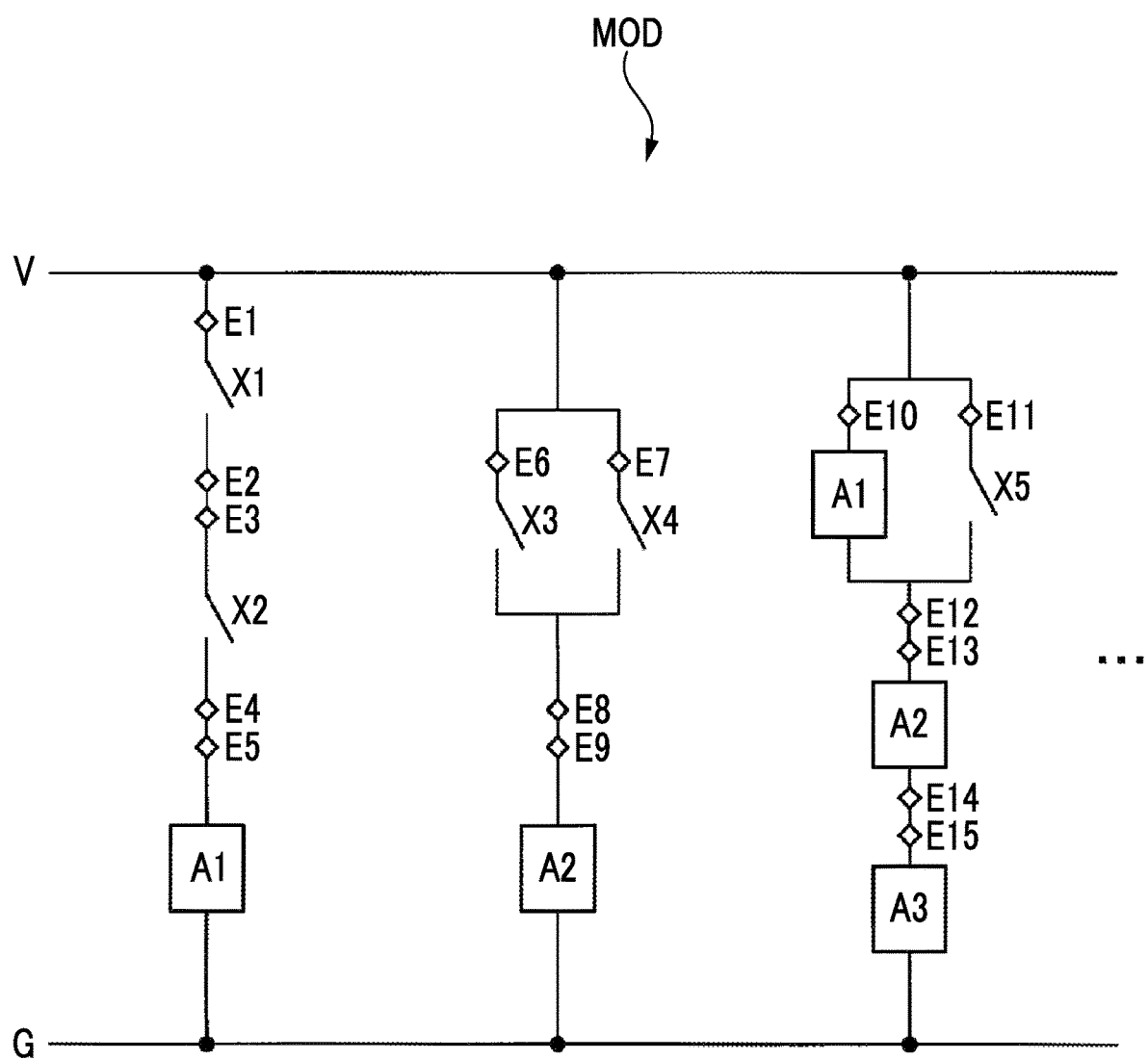
FIG. 3 is a diagram showing an example of a model to be checked according to the first embodiment.

FIG. 3 is a diagram showing an example of the model to be checked according to the first embodiment.

The model to be checked MOD shown in FIG. 3 simulates the operation logic of the relay circuit constituting the railway security system.

The wiring V and the wiring G shown in FIG. 3 are a power supply line and a ground line (ground), respectively. Further, elements A1, A2, are relay switches, and transition to an OFF state or an ON state in accordance with energization (0 (FALSE)=OFF/1 (TRUE)=ON). Further, elements X1, X2, . . . are manual switches, and transition to an OFF state or an ON state through a human operation (0=OFF/1=ON).

Elements E1, E2, . . . are virtual elements defined for reproducing troubles (disconnection and contact) that may occur in each signal line. For example, the element E1 is defined on a signal line connecting wiring V (power supply line) and element X1 (manual switch). This element E1 reproduces "occurrence of disconnection" as one of the troubles in the signal line (0=disconnection/1=non-disconnection). Further, the two elements E2 and E3 are defined on the signal line connecting the element X1 and the element X2 (manual switch). Among the elements, the element E2 reproduces "occurrence of disconnection" in the signal line (0=disconnection/1=non-disconnection), and the element E3 reproduces "occurrence of contact with the power supply line" in the signal line (0=non-contact/1=contact). Similarly, the two elements E4 and E5 are defined on the signal line connecting the element X2 and the element A1 (relay switch). Among the elements, the element E4 reproduces "occurrence of disconnection" in the signal line (0=disconnection/1=non-disconnection), and the element E5 reproduces "occurrence of contact with the power supply line" in the signal line (0=non-contact/1=contact).

The actual model to be checked MOD is described by a logical expression (language). For example, the element A1 (relay switch) is described as in Expression (1) in consideration of troubles (disconnection, contact) that may occur in each signal line in addition to the manual switches X1 and X2.

$$A1=(E1 \& X1 \& E2 \& X2 \& E4) \text{ or } (E3 \& X2 \& E4) \text{ or } (E5) \quad (1)$$

Other elements are described by the same logical expression.

Expression (1) defines the state transition of the element A1 in a case where the element A1 (relay switch) itself does not have a trouble. In reality, since there is a possibility that a trouble may occur in the element A1 itself, the model to be checked MOD also includes a transition pattern in which the element A1 transitions to the OFF state or the ON state regardless of the logical expression of Expression (1). The same applies to the other elements A2, A3, . . . , and the like.

Further, the elements X1, X2, . . . which are manual switches, are elements each of which has a state transition according to a human operation. Thus, in model checking, similarly to the elements E1, E2, . . . which define the occurrence of a trouble, the elements X1, X2, are defined as elements whose possible state transitions, which are simultaneous multiple and asynchronous, may occur at all timings.

(Processing Flow of Validation Processing Device)

Figure 4:
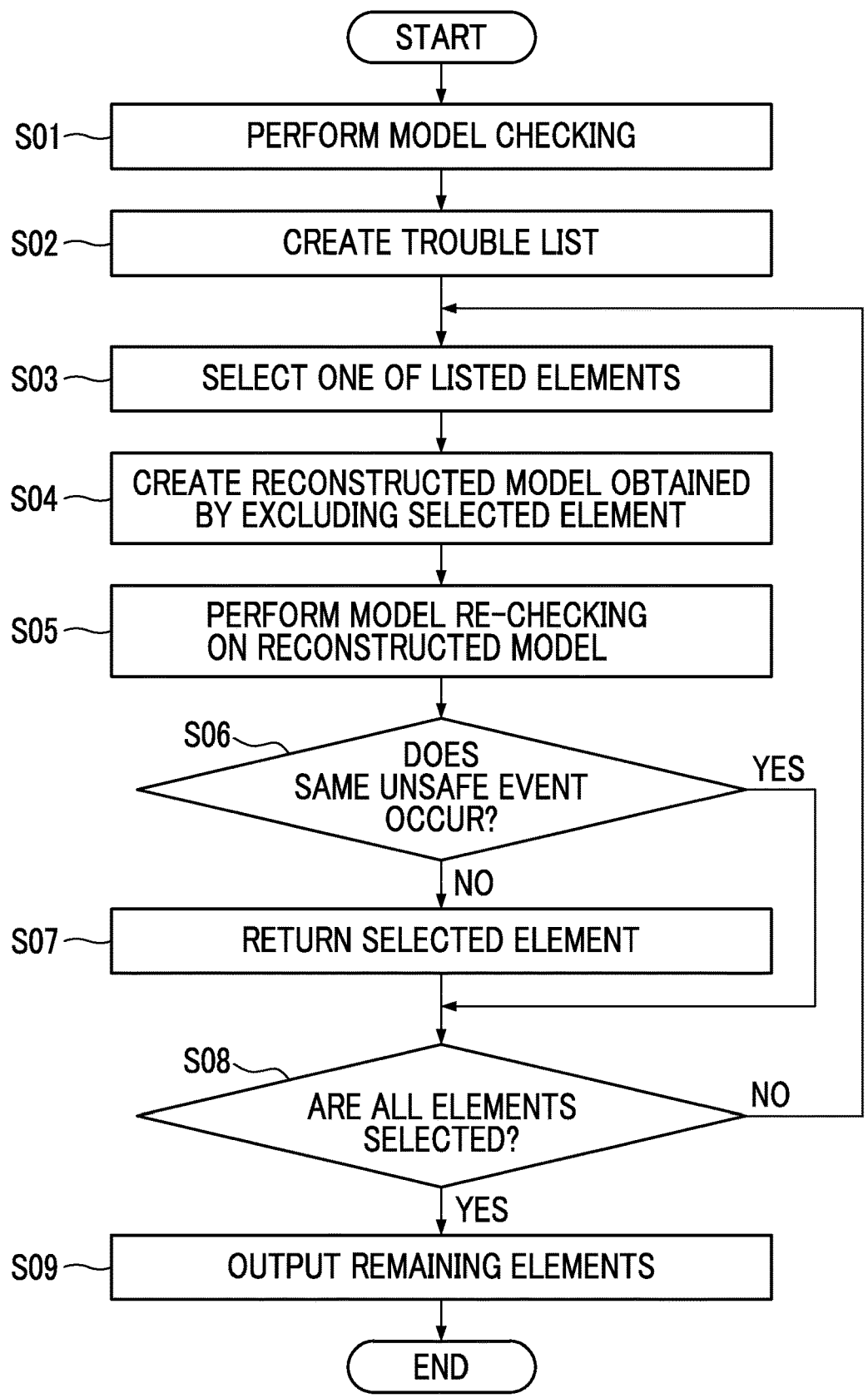
FIG. 4 is a diagram showing a processing flow of the validation processing device according to the first embodiment.

FIG. 4 is a diagram showing a processing flow of the validation processing device according to the first embodiment.

Figure 5:
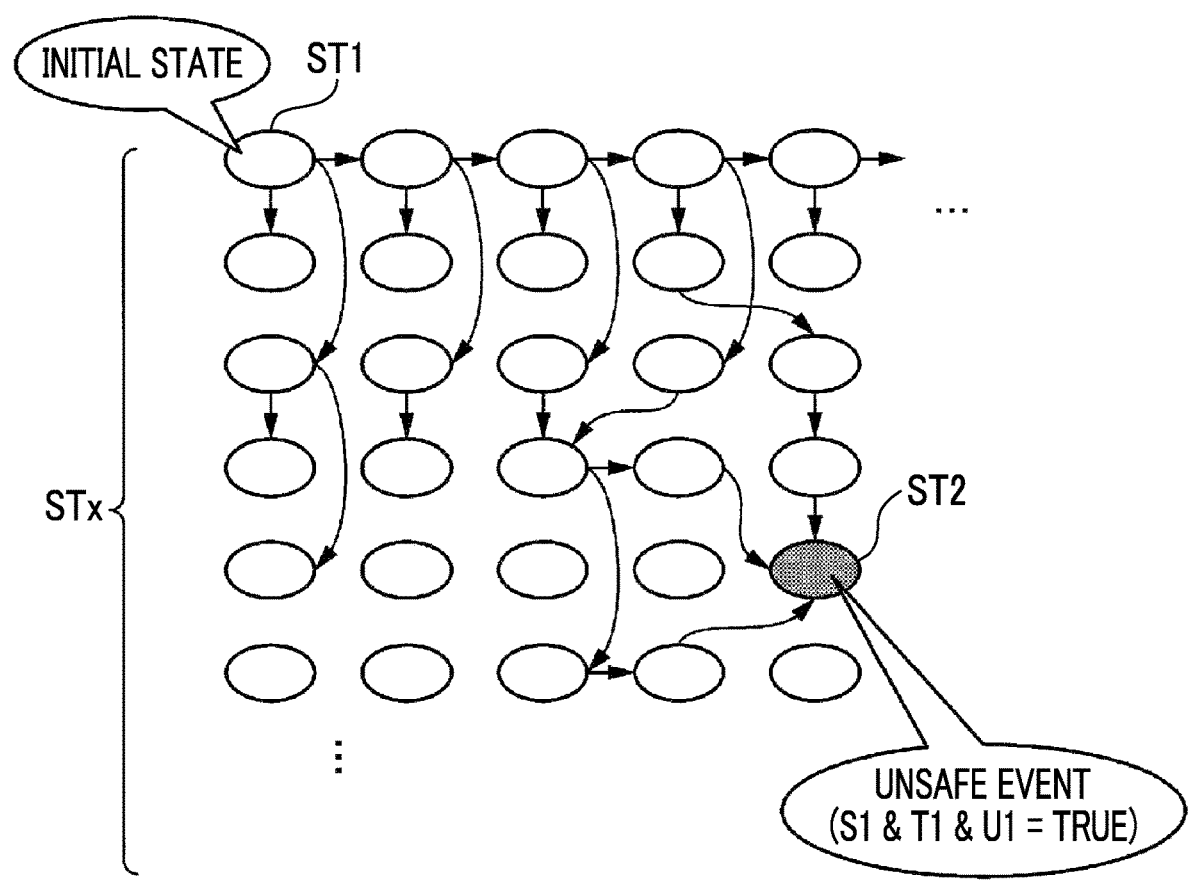
FIG. 5 is a diagram for explaining in detail the operation of the validation processing device according to the first embodiment.

FIGS. 5 and 6 are diagrams for explaining in detail the operation of the validation processing device according to the first embodiment.

The processing flow shown in FIG. 4 shows a series of processing flows of model checking for the model to be checked MOD.

First, the processing unit 100 of the CPU 10 performs normal model checking on the model to be checked MOD (step S01). The model checking performed in step S01 will be described with reference to the state transition diagram shown in FIG. 5.

Each of a plurality of states STx shown in FIG. 5 indicates a state of the model to be checked MOD shown in FIG. 3. Each state of the model to be checked MOD is defined by a combination of each state (0/1) of the elements A1, A2, . . . , X1, X2, . . . , E1, E2, . . . included in the model to be checked MOD. Among the elements, the state ST1 is an initial state of the model to be checked MOD (that is, the security system). The processing unit 100 comprehensively validates whether there is a state transition that reaches the initial state (state ST1) from the unsafe event (state ST2) in accordance with the logical expression (refer to Expression (1)) defined by the model to be checked MOD. The unsafe event (state ST2) is defined as, for example, a state including a logical expression (S1 & T1 & U1=TRUE) for other elements S1, T1, U1 included in the model to be checked MOD.

In a case where there is a path (condition) from the unsafe event (state ST2) to the initial state (state ST1), the processing unit 100 lists the elements in which the trouble occurs in the process of reaching the unsafe event, and creates a trouble list (step SO2). FIG. 6 shows an example of the trouble list created in step S02.

In a case of randomly repeating state transitions from the initial state (state ST1) and resulting in leading to an unsafe event (state ST2), the processing unit 100 lists the elements (in other words, the elements in which the trouble occurs) that have undergone state change in the process leading to the unsafe event. Then, the processing unit 100 creates a trouble list L as shown in FIG. 6.

The trouble list shown in FIG. 6 shows the list of elements, in which state transition occurs in each transition step from the state ST1 to the state ST2, and shows which value each element transitions to in which step. For example, the trouble list L shown in FIG. 6 shows leading to the unsafe event (S1 & T1 & U1=TRUE) in the state transition from the initial state to the sixth step. Further, according to the trouble list L, it can be read that the element X1 transitions from FALSE to TRUE in the 4th step and transitions from TRUE to FALSE in the 5th step in the process leading to the unsafe event.

However, the trouble list L shown in step S02 is just a list of elements that happen to have a state transition in the process of reaching an unsafe event (S1 & T1 & U1=TRUE) from the initial state as a result of repeating random state transitions. Therefore, it is presumed that each element listed in the trouble list L includes an element that does not directly contribute to the unsafe event. Therefore, the validation processing device 1 according to the present embodiment further executes the following processing of steps S03 to S08.

Specifically, the selection unit 101 of the CPU 10 selects one of the listed elements (step S03). As a simple example, in a case where there are five elements (E1, E2, E3, X1, X2) listed in the trouble list L, the selection unit 101 selects the element E1 as one of them, for example.

Next, the reconstruction unit 102 of the CPU 10 creates (reconstructs) a model excluding the elements selected in step S03 from the model to be checked MOD (step S04). Hereinafter, the model created in step S04 will also be described as a "reconstructed model". For example, in a case where the element E1 is selected in step S03, the reconstruction unit 102 creates a reconstructed model in which the element E1 is excluded from the original model to be checked MOD.

Next, the processing unit 100 performs model re-checking on the reconstructed model created in step S04 (step S05). In the above example, the reconstructed model does not include the element E1. Therefore, in the model checking performed in step S05, "occurrence of disconnection" on the signal line connecting the wiring V (power supply line, refer to FIG. 3) and the element X1 (manual switch, refer to FIG. 3) is not considered.

The processing unit 100 outputs the result of the model checking performed again in step S05, and determines whether or not the same unsafe event (S1 & T1 & U1=TRUE) as the unsafe event occurring in the first model checking (step S01) occurs (step S06).

In a case where the same unsafe event did not occur (step S06; NO), the element selected in step S03 is excluded, and as a result, the unsafe event no longer occurs. Thus, it can be said that the excluded element is a critical element that contributes to the occurrence of unsafe events. Therefore, in this case, the reconstruction unit 102 returns the element selected in step S03 to the model to be checked MOD (step S07).

On the other hand, in a case where the same unsafe event occurs (step S06; YES), the excluded element is excluded because the unsafe event still occurs even though the element selected in step S03 is excluded. Thus, it can be said that the excluded element is an element that does not contribute to the occurrence of unsafe events (the element is not critical). Since it is desirable that such an element is excluded in the counterexample interpretation, the reconstruction unit 102 moves to the next step without returning the element selected in step S03 to the model to be checked MOD.

Next, the selection unit 101 determines whether or not all the elements listed in the trouble list L in step SO2 are selected (step S08). In a case where all the elements are not selected (step S08; NO), the selection unit 101 returns to step S03 and selects one element different from the previous step S03. Then, the reconstruction unit 102 and the processing unit 100 repeat the processing of steps S04 to S07.

In a case where all the elements are selected (step S08; YES), the selection unit 101 outputs the elements listed in the trouble list L that remain in the model to be checked MOD (step S09).

For example, among the elements (E1, E2, E3, X1, X2) listed in the trouble list L in step SO2, the elements (E1, E2, X1) are excluded since the elements are not critical through the processing from step S03 to step S08. Then, the remaining elements (E3, X2) are output in step S09.

(Effects and Advantages)

As described above, the validation processing device 1 according to the first embodiment includes: the processing unit 100 that performs model checking on the model to be checked MOD; and the selection unit 101 that selects, on the basis of a result of the model checking, one element among elements that have undergone state change in a process leading to the unsafe event. Then, the processing unit 100 performs model re-checking on the model to be checked (reconstructed model) excluding one element selected by the selection unit 101.

In such a manner, it is possible to extract only the troubles that directly cause the unsafe event from the plurality of elements (troubles) shown in the model checking (refer to step S09 in FIG. 4). Therefore, the validator of the model to be checked MOD only needs to perform counterexample interpretation for the counterexample including only the critical elements contributing to the occurrence of the unsafe event. As a result, it is possible to reduce the work load of the counterexample interpretation.

Further, in a case where the model to be checked has not led to the unsafe event in the model re-checking, the processing unit 100 according to the first embodiment returns the selected one element to the model to be checked MOD, and performs model re-checking on a model to be checked which is obtained by excluding an element, which is different from the one element, from the model to be checked MOD.

Further, in a case where the model to be checked has not led to the unsafe event in the model re-checking, the processing unit 100 according to the first embodiment does not return the selected one element to the model to be checked MOD, but performs model re-checking on a model to be checked which is obtained by excluding an element, which is different from the one element, from the model to be checked MOD.

In such a manner, it is possible to automate the work of extracting only the critical elements related to unsafe events from the candidate elements (troubles) listed in the first trouble list L. As a result, it is possible to further reduce a load on the validator.

Modification Example of First Embodiment

Although the validation processing device 1 according to the first embodiment has been described in detail above, the specific embodiment of the validation processing device 1 is not limited to the above, and various modifications in design thereof can be made without departing from the scope. For example, the processing unit 100 according to the modification example of the first embodiment may further have the following functions.

The processing unit 100 according to the modification example of the first embodiment performs model re-checking (step S05 in FIG. 4) within the range equal to or less than the number of transition steps leading up to the unsafe event specified in the first model checking (step S01 in FIG. 4) for the model to be checked MOD.

For example, in the example of the trouble list L shown in FIG. 6, as a result of the first model checking, it is identified that the model to be checked MOD reaches an unsafe event (S1 & T1 & U1=TRUE) through 6 state transitions (number of transition steps=6). It should be noted that the first model checking is performed without setting a special upper limit on the number of transition steps for the purpose of covering the possibility of all state transitions leading to unsafe events.

Here, the number of transition steps leading to the unsafe event in the model re-checking (step S05 in FIG. 4) for the model to be checked MOD with the reduced number of elements is not greater than the number of transition steps leading to the unsafe event in model checking (step S01 in FIG. 4) for the model to be checked MOD before the number of elements is reduced. Therefore, in the model re-checking performed in step S05 of FIG. 4, the number of transition steps found in the model checking performed in step S01 of FIG. 4 may be set as an upper limit and then the model re-checking may be performed. In such a manner, the number of transition steps to be validated in the second and subsequent model checkings on the model to be checked MOD is limited. Therefore, the processing load and processing time required for the second and subsequent model checkings can be reduced.

Second Embodiment

Next, the validation processing device according to the second embodiment will be described with reference to FIGS. 7 to 9.

(Configuration of Validation Processing Device)

Figure 7:
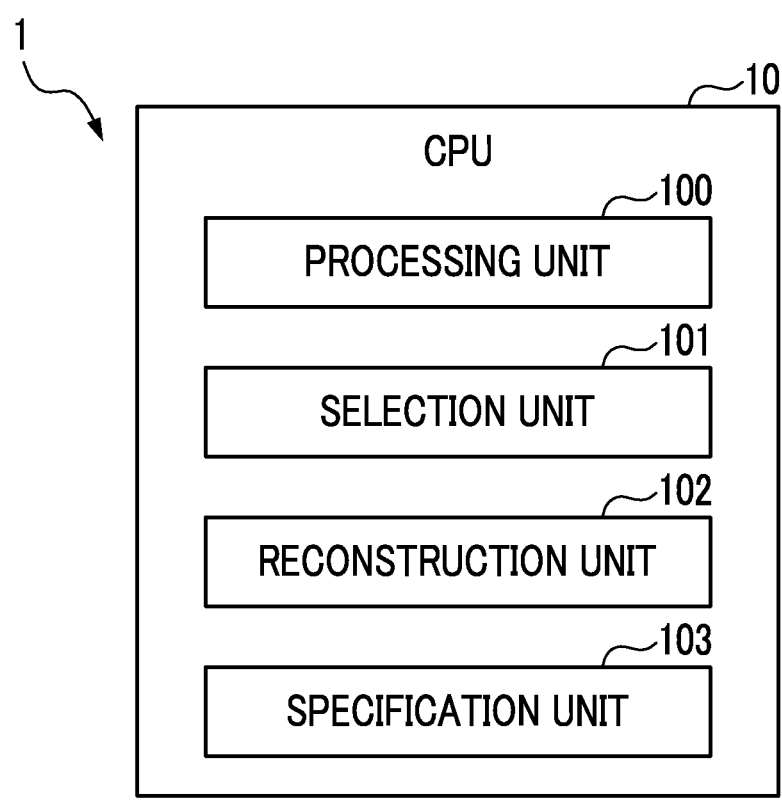
FIG. 7 is a diagram showing a functional configuration of a CPU of a validation processing device according to a second embodiment.

FIG. 7 is a diagram showing a functional configuration of a CPU of the validation processing device according to the second embodiment.

As shown in FIG. 7, the CPU 10 according to the second embodiment further exerts a function as the specification unit 103.

The specification unit 103 specifies the shortest path from the element extracted on the basis of the result of the model re-checking (refer to step S09 in FIG. 4) to the element included in the definition of the unsafe event.

The processing performed by the specification unit 103 may be, for example, processing which is automatically executed after the series of processing shown in FIG. 4 is completed.

(Processing of Shortest Path Specification Unit)

Figure 8:
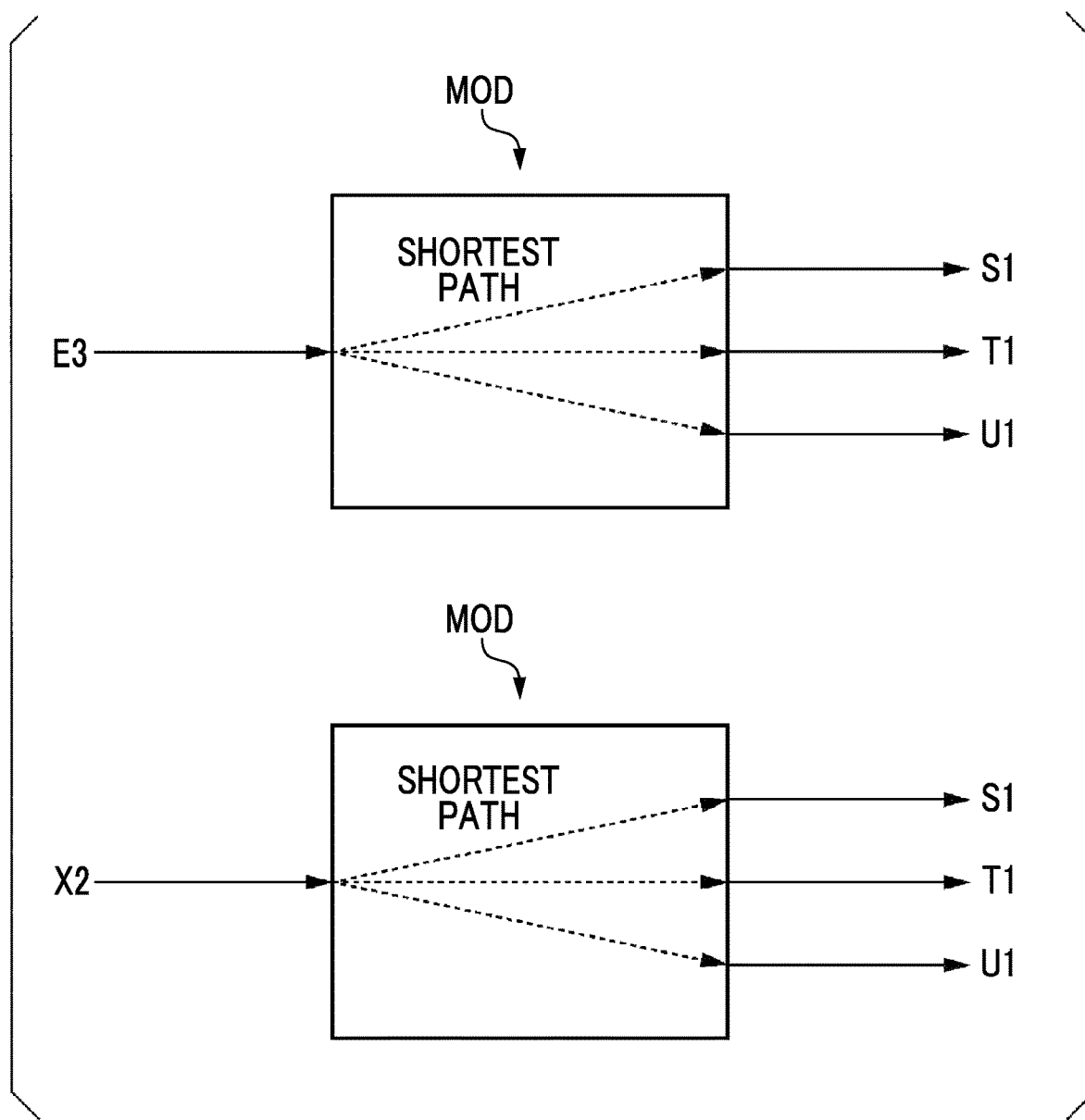
FIG. 8 is a diagram for explaining in detail the operation of the specification unit according to the second embodiment.
Figure 9:
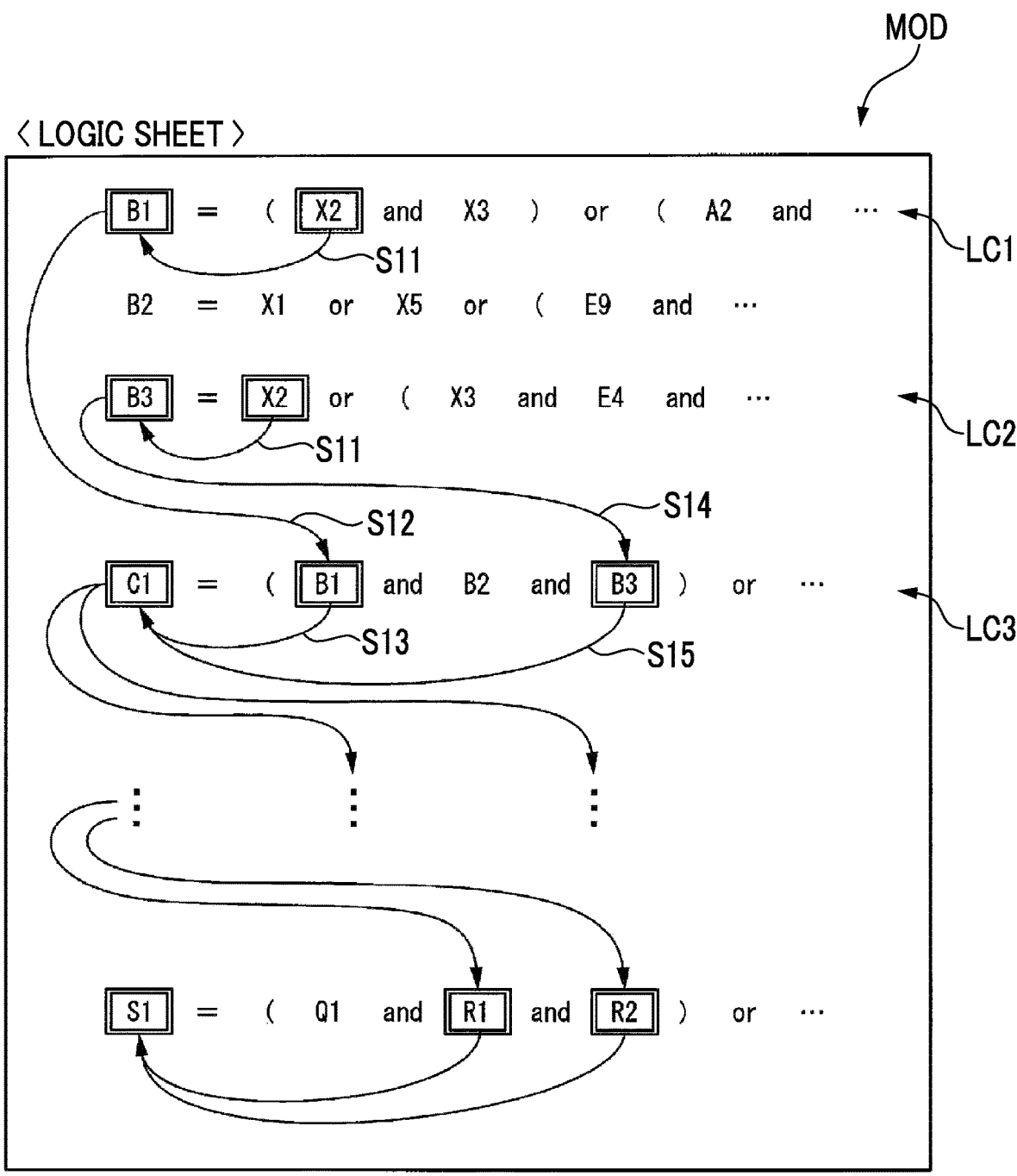
FIG. 9 is a diagram for explaining in detail the operation of the specification unit according to the second embodiment.

FIGS. 8 and 9 are diagrams for explaining in detail the operation of the shortest path specification unit according to the second embodiment.

As a result of the processing flow shown in FIG. 4, it is assumed that elements (E3, X2) are extracted as critical elements leading to the unsafe event (step S09 in FIG. 4). In this case, as shown in FIG. 8, the shortest path specification unit 103 specifies a shortest path until the state transitions (troubles) respectively occurring in the extracted elements E3 and X2 cause the respective state transitions of the elements (elements S1, T1, and U1) included in the definition of the unsafe event.

More specifically, as shown in FIG. 9, the shortest path described above is specified with reference to a logic sheet (set of logical expressions) that defines the model to be checked MOD. Here, FIG. 9 shows an example of processing for specifying the shortest path until the state transition occurring in the element X2 causes the state transition in the element S1.

As shown in FIG. 9, first, the shortest path specification unit 103 refers to the logic sheet and specifies a logical expression including the element X2 on the right side. According to the logical expressions LC1 and LC2 specified herein, the elements B1 and B3 are specified as elements affected by the state transition of the element X2 (step S11).

Next, the shortest path specification unit 103 refers to the logic sheet and specifies a logical expression including the element B1 on the right side (step S12). According to the logical expression LC3 specified herein, the element C1 is specified as an element affected by the state transition of the element B1 (step S13). Similarly, the shortest path specification unit 103 refers to the logic sheet and specifies a logical expression including the element B3 on the right side (step S14). According to the logical expression LC3 specified herein, the same element C1 as the element specified in step S13 is specified as an element affected by the state transition of the element B3 (step S15).

The shortest path specification unit 103 repeatedly executes the above processing from step S11 to step S15 until the element S1 is reached. As a result, the shortest path from the element X2 to the element S1 is specified.

Similarly, the shortest path specification unit 103 specifies the shortest path from the element X2 to the element T1, the shortest path from the element X2 to the element U1, the shortest path from the element E3 to the element S1, the shortest path from the element E3 to the element T1, and the shortest path from the element E3 to the element U1.

(Effects and Advantages)

As described above, according to the validation processing device 1 according to the second embodiment, it is possible to automatically specify the shortest path from a critical trouble (element) that causes an unsafe event to an actual unsafe event. Further, due to the effect obtained in the first embodiment, the shortest path specified by the shortest path specification unit 103 is only the shortest path (critical path) directly connected to the unsafe event, and does not include the shortest path from the element which does not contribute to the occurrence of the unsafe event. As a result, the validator only needs to consider countermeasures for the critical path specified by the shortest path specification unit 103. Therefore, the work load required for counterexample validation can be further reduced.

The validation processing device 1 according to the modification example of the second embodiment may further have a function of displaying, as animation, a figure in which a trouble occurring in the relay circuit propagates through the critical path, on a separately provided circuit diagram (refer to FIG. 3). This allows the validator to more intuitively understand the process through which an unsafe event occurs.

Third Embodiment

Next, the validation processing device according to a third embodiment will be described with reference to FIGS. 10 to 12.

(Configuration of Validation Processing Device)

Figure 10:
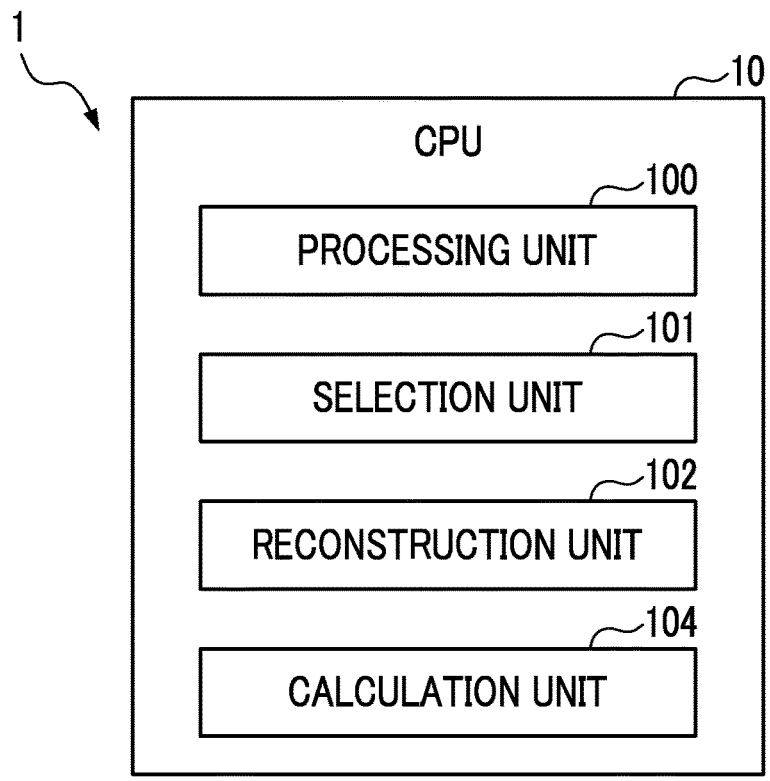
FIG. 10 is a diagram showing a functional configuration of a CPU of a validation processing device according to a third embodiment.

FIG. 10 is a diagram showing a functional configuration of a CPU of the validation processing device according to the third embodiment. As shown in FIG. 10, the CPU 10 according to the third embodiment further exerts a function as a calculation unit 104.

The calculation unit 104 calculates a probability (reaching probability) of leading the model to be checked MOD to the unsafe event from the initial state, on the basis of the trouble occurrence probability 2, defined in advance for each element X1, X2, . . . E1, E2, . . . A1, A2, . . . . The trouble occurrence probability 2, is a probability that a trouble occurs in each element within a unit time (for example, within 1 hour). It is assumed that such a trouble occurrence probability λ is specified in advance for each element on the basis of past operation results and simulations.

(Processing of Calculation Unit)

Figure 11:
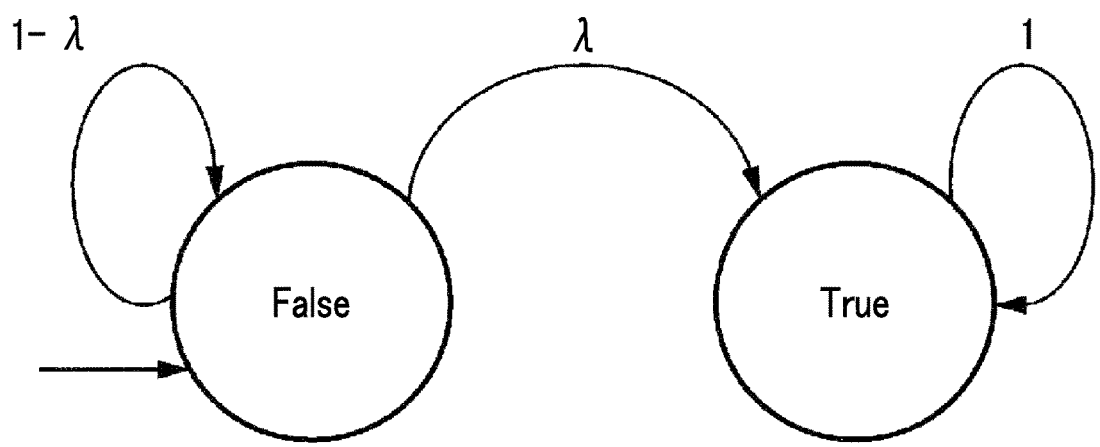
FIG. 11 is a diagram for explaining in detail the operation of the calculation unit according to the third embodiment.
Figure 12:
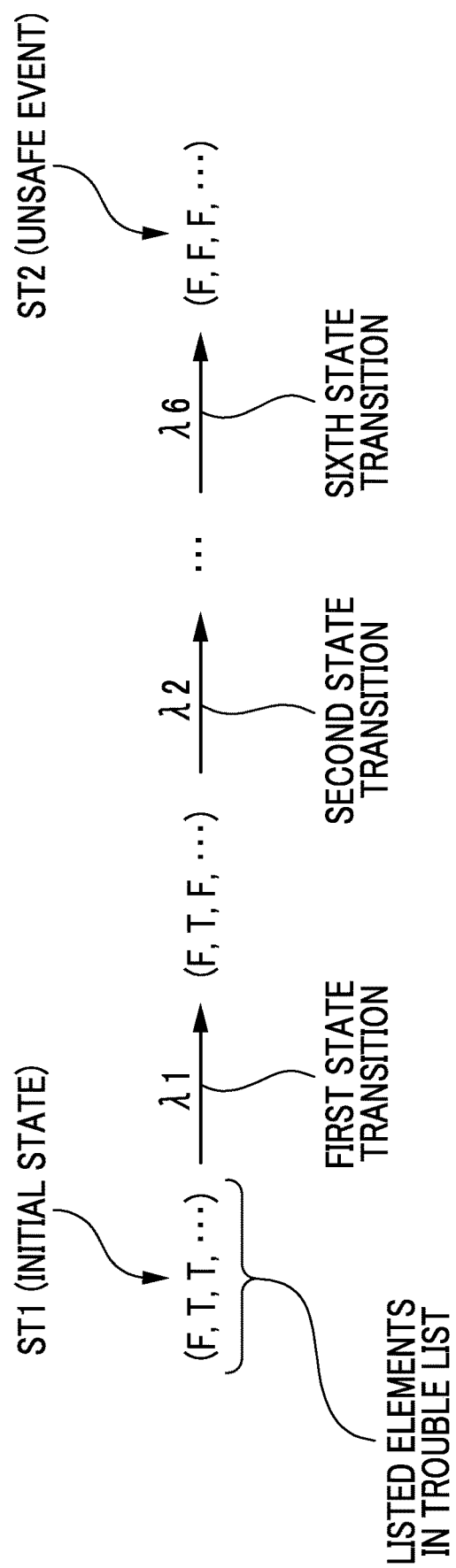
FIG. 12 is a diagram for explaining in detail the operation of the calculation unit according to the third embodiment.

FIGS. 11 to 12 are diagrams for explaining in detail the operation of the calculation unit according to the third embodiment.

FIG. 11 shows an example of a failure model defined for each element of the model to be checked MOD. FIG. 11 is a failure model showing "occurrence of contact", which is one of the troubles that occur in the signal line. According to the failure model shown in FIG. 11, from a state where no contact occurs (False), the signal line remains in the same state (False) with a probability of "1−λ", and transitions to a state where contact occurs with a probability of "λ" (True). Then, once the contact occurs, the signal line constantly (with a probability of 1) remains in the same state (True). Although not shown, a failure model is individually defined for "occurrence of disconnection" in the signal line. Further, a failure model for the element X1 which is a manual switch, a failure model for the element A1 which is a relay switch, and the like are also defined in the same manner.

FIG. 12 is a diagram for specifically explaining the processing of the calculation unit 104. The calculation unit 104 according to the present embodiment calculates the probability of leading to occurrence of the unsafe event shown in the trouble list L after the trouble list L (FIG. 6) created by the processing unit 100 is created (after step S02 in FIG. 4).

Specifically, the calculation unit 104 calculates the probability that the first state transition shown in the trouble list L occurs (state transition probability $\lambda 1$). Here, the calculation unit 104 calculates the state transition probability $\lambda 1$ using the failure model of the element changed in the first state transition (refer to FIG. 11). Similarly, the calculation unit 104 calculates the probability that the second state transition shown in the trouble list L occurs (state transition probability $\lambda 2$).

Here, the calculation unit 104 calculates the state transition probability $\lambda 2$ using the failure model of the element changed in the second state transition. Hereinafter, in the same manner, the respective state transition probabilities $\lambda 3$, $\lambda 4$, ..., $\lambda 6$ leading to the unsafe event (state ST2) are calculated. Then, the calculation unit 104 calculates the probability that the state transition shown in the trouble list L occurs, that is, the probability ($\lambda 1 \times \lambda 2 \times \ldots \times \lambda 6$) of leading to the unsafe event (state ST2) from the initial state (state ST1).

(Effects and Advantages)

As described above, the validation processing device according to the third embodiment further includes a calculation unit 104 that calculates a probability of leading the model to be checked MOD to the unsafe event from an initial state, on the basis of a trouble occurrence probability $\lambda$ defined for each element.

As a result, in a case where the trouble list L is created as a result of the first model checking (step S01 in FIG. 4) for the model to be checked MOD, the sum of all the probabilities leading to the unsafe event can be obtained. Then, the priorities of counterexample interpretation and countermeasures can be appropriately determined in accordance with the probability. For example, in a case where the occurrence probability of the state transition shown in the trouble list created in step S02 of FIG. 4 is extremely low (in a case where the predetermined determination threshold value is not reached), the processing in and after step S03 of FIG. 4 is omitted. As a result, it is possible to immediately determine that another trouble list L is narrowed down or the processing moves to counterexample validation.

From the above, it is possible to further improve the efficiency of the work of counterexample interpretation of the model to be checked MOD.

In the first to third embodiments described above, the various processing processes of the CPU 10 described above are stored in a computer-readable recording medium in the form of a program, and various kinds of processing are performed by reading and executing the program through the computer. The computer-readable recording medium refers to a magnetic disk, a magneto-optical disk, a CD-ROM, a DVD-ROM, a semiconductor memory, or the like. Further, this computer program may be transferred to a computer via a communication line, and the computer receiving the transfer may execute the program.

The above program may be for realizing a part of the above-mentioned functions. Further, a so-called difference file (difference program) may be used, which can realize the above-mentioned functions in combination with a program already recorded in the computer system.

As described above, some embodiments according to the present invention have been described, but all of these embodiments are presented as examples and are not intended to limit the scope of the invention. These embodiments can be implemented in various other embodiments, and various omissions, replacements, and modifications can be made without departing from the spirit of the invention. In a case where these embodiments and modifications thereof are included in the scope and spirit of the invention, similarly, the embodiments and modifications are included in the scope of the invention described in the claims and the equivalent scope thereof.

INDUSTRIAL APPLICABILITY

According to each aspect of the present invention, it is possible to reduce the load required for the work of counterexample interpretation of model checking.

REFERENCE SIGNS LIST

1: validation processing device
10: CPU
100: processing unit
101: selection unit
102: reconstruction unit
103: specification unit
104: calculation unit
11: memory
12: display
13: input device
14: storage
MOD: model to be checked
L: trouble list

The invention claimed is:

1. A validation processing device comprising:
   a processing unit that performs model checking on a model to be checked; and
   a selection unit that selects, on the basis of a result of the model checking, one element among elements that have undergone a state change in a process leading to an unsafe event,
   wherein the processing unit further performs model re-checking on a model to be checked which is obtained by excluding the one element.

2. The validation processing device according to claim 1, wherein in a case where the model to be checked has not led to the unsafe event in the model re-checking, the processing unit returns the one element to the model to be checked, and performs model re-checking on a model to be checked which is obtained by excluding an element, which is different from the one element, from the model to be checked.

3. The validation processing device according to claim 2, wherein in a case where the model to be checked has led to the unsafe event in the model re-checking, the processing unit does not return the one element to the model to be checked, and performs model re-checking on a model to be checked which is obtained by excluding an element, which is different from the one element, from the model to be checked.

4. The validation processing device according to claim 1, wherein the processing unit performs the model re-checking within a range equal to or less than the number of transition steps leading up to the unsafe event specified in a first model checking for the model to be checked.

5. The validation processing device according to claim 1, further comprising a specification unit that specifies a shortest path from an element extracted on the basis of a result of the model re-checking to an element included in a definition of the unsafe event.

6. The validation processing device according to claim 1, further comprising a calculation unit that calculates a probability of leading the model to be checked to the unsafe event from an initial state, on the basis of a trouble occurrence probability defined for each element.

7. The validation processing device according to claim 6, wherein in a case where the probability is lower than a predetermined determination threshold value, the selection unit omits processing of selecting the one element on the basis of a result of the model checking.

8. A validation processing method comprising:
- a step of performing model checking on a model to be checked;
- a step of selecting, on the basis of a result of the model checking, one element among elements that have undergone a state change in a process leading to an unsafe event; and
- a step of performing model re-checking on a model to be checked which is obtained by excluding the one element.

9. A non-transitory computer-readable medium that stores a program causing a computer of a validation processing device to execute:
- a step of performing model checking on a model to be checked;
- a step of selecting, on the basis of a result of the model checking, one element among elements that have undergone a state change in a process leading to an unsafe event; and
- a step of performing model re-checking on a model to be checked which is obtained by excluding the one element.

* * * * *